United States Patent [19]

Sakuragi et al.

[11] Patent Number: 5,181,240
[45] Date of Patent: Jan. 19, 1993

[54] DATA CIRCUIT-TERMINATING EQUIPMENT WITH POWER SOURCE DEVICE

[75] Inventors: Satoshi Sakuragi, Yokohama; Takeshi Ikeda, Sagamihara; Takashi Kuroda, Yokohama, all of Japan

[73] Assignee: Murata Mfg. Co., Ltd., Kyoto, Japan

[21] Appl. No.: 696,935

[22] Filed: May 8, 1991

Related U.S. Application Data

[63] Continuation-in-part of Ser. No. 425,923, Oct. 24, 1989, abandoned.

[30] Foreign Application Priority Data

Nov. 4, 1988 [JP] Japan ................... 63-144263

[51] Int. Cl.⁵ .......................................... H04M 11/00
[52] U.S. Cl. ...................... 379/98; 379/413; 375/8
[58] Field of Search ............. 379/98, 93, 96, 97, 379/100, 413; 375/5, 8

[56] References Cited

U.S. PATENT DOCUMENTS

| | | | |
|---|---|---|---|
| 4,395,590 | 7/1983 | Pierce et al. | 375/8 |
| 4,415,774 | 11/1983 | Driver | 379/93 |
| 4,578,533 | 3/1986 | Pierce | 379/93 |
| 4,593,389 | 6/1986 | Wurzburg et al. | 370/110.1 |
| 4,691,344 | 9/1987 | Brown et al. | 379/98 |
| 4,803,719 | 2/1989 | Ulrich | 379/93 |

FOREIGN PATENT DOCUMENTS

59-188269 10/1984 Japan .
60-207454 10/1985 Japan .

OTHER PUBLICATIONS

*Understanding Telephone Electronics* Radio Shack 1984, pp. 9-15 to 9-16.
JP-A-58 159 668, Canon, Sep. 22, 1983, Patent Abstract of Japan, vol. 7, No. 280.
IBM Technical Disclosure Bulletin, vol. 28, No. 2, Jul. 1985, pp. 668-669.

*Primary Examiner*—James L. Dwyer
*Assistant Examiner*—Wing F. Chan
*Attorney, Agent, or Firm*—Oliff & Berridge

[57] ABSTRACT

A data circuit-terminating equipment with a power source device attached thereto comprising a data circuit-terminating device such as a modem system including a power source device for supplying a power extracted from a telephone circuit to the data circuit-terminating device.

28 Claims, 7 Drawing Sheets

DATA CIRCUIT-TERMINATING EQUIPMENT WITH POWER SOURCE DEVICE

CROSS REFERENCE TO RELATED APPLICATION

This application is a Continuation-in-Part of U.S. patent application Ser. No. 07/425,923, filed Oct. 24, 1989, entitled "Data Circuit-Terminating Equipment with Power Source Device Attached Thereto" now abandoned.

BACKGROUND OF THE INVENTION

1. Field of the Invention

The present invention relates to the improvement of a data circuit-terminating equipment with a power source device.

2. Description of the Related Arts

A data communication system for connecting the data terminal equipments (hereinunder referred to as "DTE") of personal computers or the like through a telephone circuit and for transmitting and receiving data between the DTEs has recently been increasingly used.

Modems (modulator/demodulator) 10 are attached to respective DTEs 12 in the data communication system schematically as shown in FIG. 5, and are connected with each other by a telephone circuit 14. The modem 10 is a device for modulating the signal from the DTE 12 to a signal suitable for use by the telephone circuit 14 and for demodulating the signal received from the telephone circuit 14 to a signal suitable for the DTE 12, and plays an important role in a data communication system having the structure such as that shown in FIG. 5. The reference numeral 16 represents an RS232C cable.

The structure of the conventional modem 10 will be explained with reference to FIG. 6.

As shown in FIG. 6, the modem 10 mainly includes a modulation and demodulation circuit 18 for modulating a digital signal supplied from the DTE 12 to a circuit signal, demodulating the received circuit signal to a digital signal of an RS232C type and supplying it to the DTE 12, and a net control unit 20 (hereinunder referred to as NCU) for controlling the connection between the modulation and demodulation circuit 18 and a telephone circuit 14.

The modem 10 is further provided with a two-wire four-wire circuit 22, namely, a circuit for dividing the telephone circuit 14 connected to the terminals 1 and 2 of the NCU 20 into a transmitting circuit and a receiving circuit.

A conventional modem has the above-described structure. This modem is disadvantageous in that since a power source apparatus 24 exclusively for driving the modem is necessary, the miniaturization of a data communication system is difficult.

SUMMARY OF THE INVENTION

Accordingly, it is an object of the present invention to eliminate the above-described problems in the prior art and to provide a simple and small-sized data circuit-terminating equipment for constituting a data communication system.

To achieve this aim, an equipment according to the present invention is provided with a power source device for obtaining the power from the offhook current supplied from a telephone circuit and supplying the power from the power source device to a data circuit-terminating equipment such as a modem system.

According to the equipment of the present invention, since the power source device can obtain a power for driving a modem or the like by utilizing the power of an offhook current which is conventionally wasted by an NCU or the like, it is possible to reduce the size of the equipment and improve the efficiency thereof.

It is preferable to provide a power converter circuit within the power source device so as to obtain the power. The power converter circuit includes, for example, a DC-DC converter. As the DC-DC converter, either a self-excited converter or a separately-excited converter may be used. The power source device may also include a battery which outputs a power only at the time of onhook.

In the case of using a modem system as the data circuit-terminating equipment, the modem system includes a modulation and demodulation circuit, a two-wire four-wire circuit, an NCU and a power source device.

The two-wire four-wire circuit receives and supplies a signal from and to the modulation and demodulation circuit by using a light receiving element and a light emitting element such as a photodiode. It is also preferable to provide the NCU with a light receiving element for detecting offhook.

The NCU preferably includes a constant-current circuit, a shunt regulator, a smoothing circuit or lowpass filter, etc.

In regard to the off-hook currents, the constant current circuit appears to have a higher impedance and supplies constant current to the shunt regulator. The shunt regulator regulates the current so that the power converter circuit is not superfluous.

The smoothing circuit or the lowpass filter smooths the current supplied from the shunt regulator to the power converter circuit, and prevents the offhook current in the telephone circuit from fluctuating due to the output current fluctuation of the shunt regulator caused by the operation of the power converter circuit.

In the case of adopting a modem system as the data circuit-terminating equipment, the DC-DC converter preferably supplies a power to both of the modulation and demodulation circuit and the two-wire four-wire circuit.

The above and other objects, features and advantages of the present invention will become clear from the following description of the preferred embodiments thereof, taken in conjunction with the accompanying drawings.

DESCRIPTION OF THE PREFERRED EMBODIMENTS

A preferred embodiment of the equipment according to the present invention will be explained hereinunder with reference to the accompanying drawings.

Figure 1:
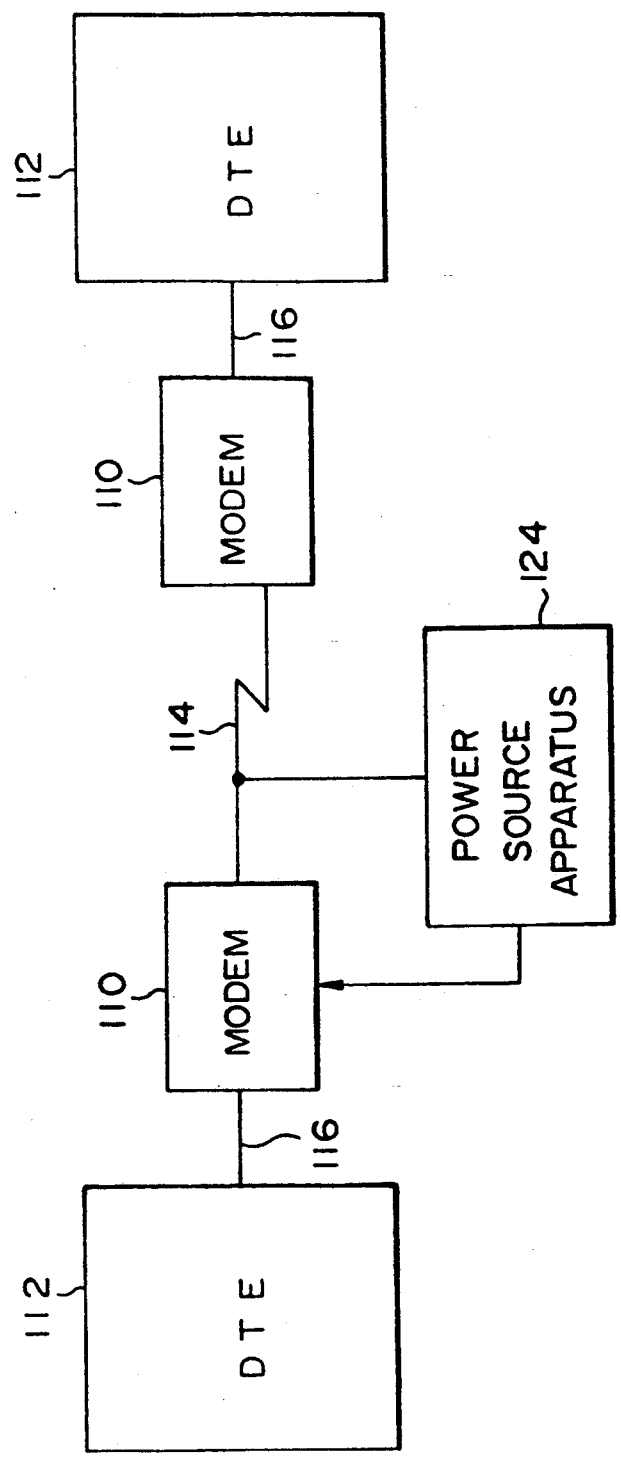
FIG. 1 shows the structure of a data communication system adopting a first embodiment of the present invention, wherein a power source device 124 is connected to a telephone circuit 114 and a modem 110.

In FIG. 1, the power source device 124 is connected to a telephone circuit 114 to take in the power of the circuit, and outputs a predetermined voltage so as to supply a power to, for example, the modem 110. The modem 110 is connected to a DTE 112 through an RS232C cable 116 and is also connected to the telephone circuit 114.

Figure 2:
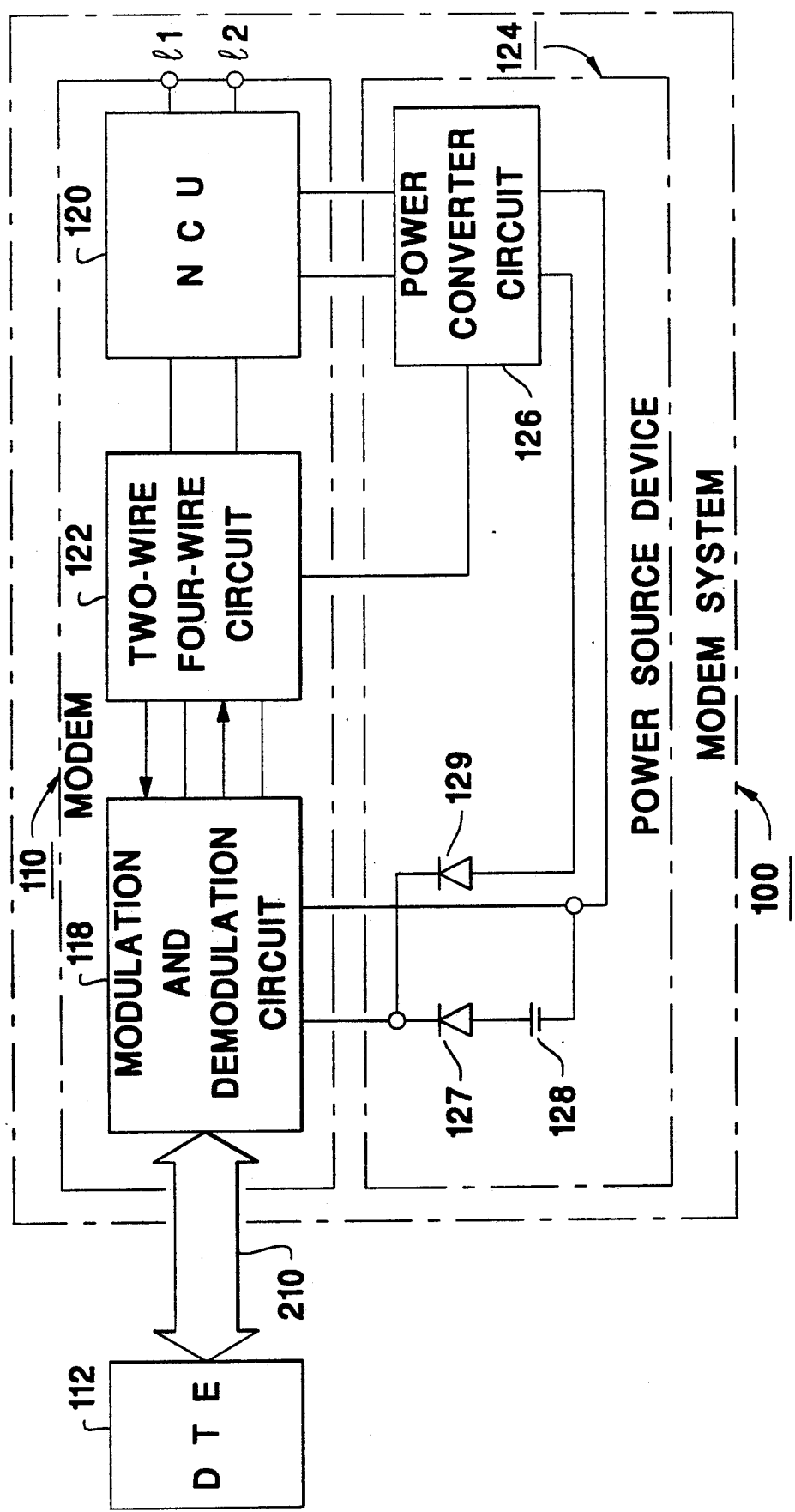
FIG. 2 is a block diagram of the details of the modem system 100 including the modem 110 and the power source device 124 shown in FIG. 1.

In FIG. 2, the modem 110 in modem system 100 is connected to the telephone circuit 114 (not shown) through the terminals 1 and 2.

To the modem 110, a power converter circuit 126 including a DC-DC converter for converting the power of an offhook current is connected through diode 129, power converter circuit 126 and diode 129 being provided in power source device 124 of modem system 100. An offhook current input from the terminals 1 and 2 is input to the power converter circuit 126 through an NCU 120.

The NCU 120 supplies a signal current overlapping with the offhook current input from the terminals 1 and 2 to a two-wire four-wire circuit 122 and also supplies the residual current of the offhook current to the power converter circuit 126.

The power converter circuit 126 in power source device 124 converts the offhook current to a predetermined voltage level and supplies the thus-converted power to the two-wire four-wire circuit 122 and the modulation and demodulation circuit 118, both in modem 110, as a driving power.

A battery 128 in power source device 124 supplies a power to the modulation and demodulation circuit 118 through a diode 127 only when the telephone circuit 114 is in the onhook state.

The diode 127 prevents the current from the power converter circuit 126 from flowing to the battery 128 in the offhook state, while the diode 129 prevents the current from the battery 128 from flowing to the power converter circuit 126. The voltage applied by the power converter circuit 126 is set higher than the voltage applied by the battery 128.

It is therefore unnecessary to provide a self-excited power source exclusively for the modem 110 and it is possible to use the offhook current, which is the telephone circuit current, as a driving power source by converting the power thereof by the power converter circuit 126 of power source device 124.

Figure 3:
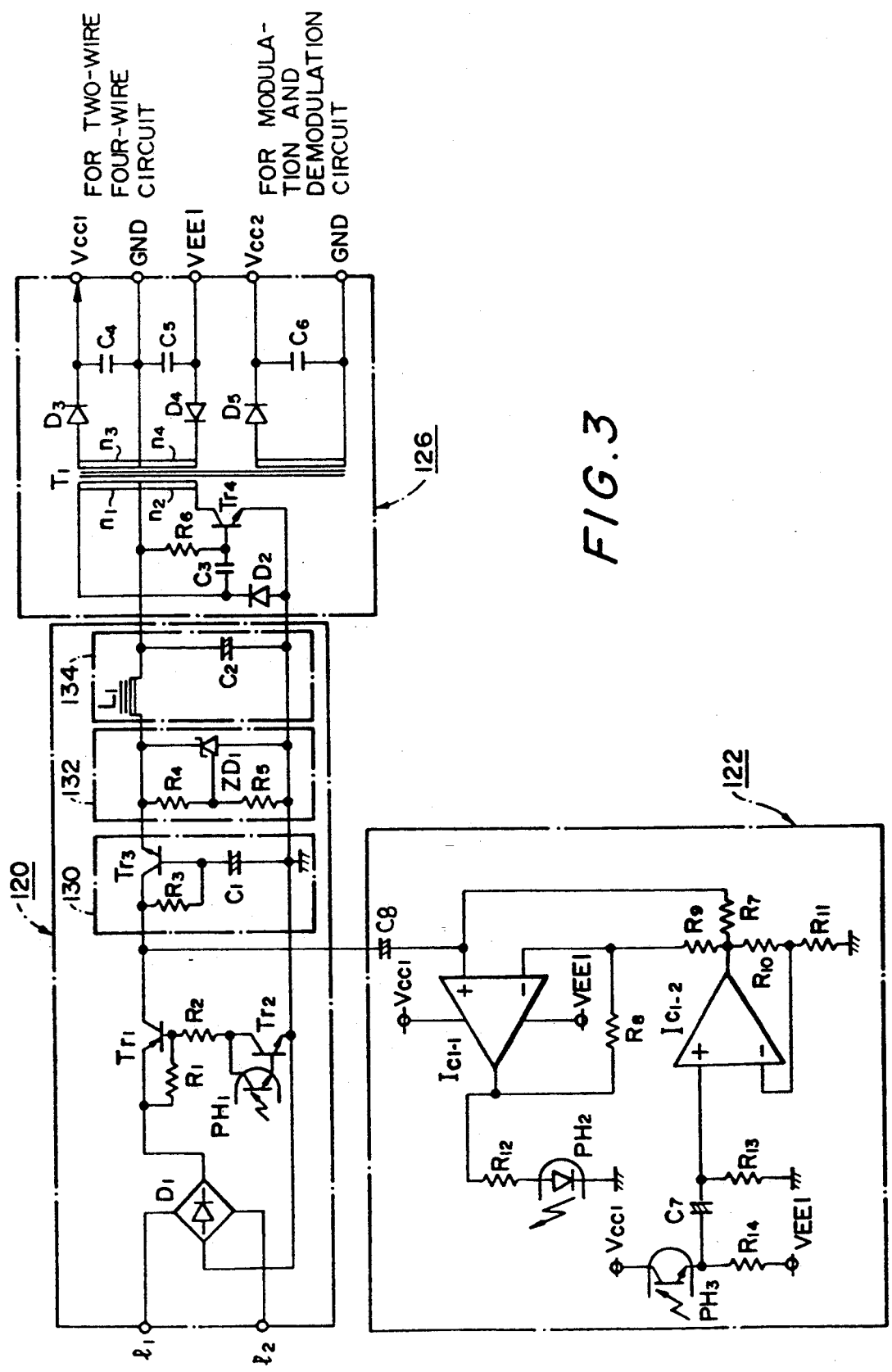
FIG. 3 is a circuit diagram of an NCU 120, a two-wire four-wire circuit 122 and a DC-DC converter 126.

As shown in FIG. 3, when the modem 110 is in the communication state, in other words, in the offhook state, a photocoupler PH$_1$ in the NCU 120 is turned on, and transistors Tr$_1$ and TR$_2$ are turned on, whereby a telephone circuit current flows from terminals 1 and 2 through a rectifier D$_1$.

The current output from the telephone circuit 114 at this time is the offhook current and the rectified offhook current is output to the two-wire four-wire circuit 122 and a constant-current circuit 130. The D.C. component of the offhook current is eliminated by the condenser C8, and the signal current in the offhook current is further converted to four-wire signals by operational amplifiers I$_{cl-1}$ and I$_{cl-2}$. Since the operational amplifiers I$_{cl-1}$ and I$_{cl-2}$ are connected to the modulation and demodulation circuit 118 (not shown) through the photocouplers PH$_2$ and PH$_3$, respectively, in the state of being electrically insulated therefrom, the signals are transmitted and received between the operational amplifiers I$_{cl-1}$ and I$_{cl-2}$ and the modulation and demodulation circuit 118 (not shown).

The NCU 120 is provided with a constant-current circuit 130, a shunt regulator 132 and a smoothing circuit 134.

The constant-current circuit 130 is comprised of a transistor Tr$_3$, a resistance R$_3$ and a capacitor C$_1$.

The resistance R$_3$ and the capacitor C$_1$ act to determine the base current of the transistor Tr$_3$. In this case, the resistance value of the resistance R$_3$ is set at a large value to reduce the passing of the signal current component of the offhook current. However, such a large resistance value of the resistance R$_3$ reduces also the base current of the transistor Tr$_3$. Therefore, a transistor having a large current amplifying factor hf is used. As occasion demands, a darlington connection of the transistors can be used. Since the capacitor C$_1$ flows A.C. components to the ground, the base Voltage of the transistor Tr$_3$ is kept constant, thereby providing a constant current from the emitter.

In the offhook state, since the impedance on the collector side of the transistor Tr$_3$ becomes high, it is possible to transmit and receive a signal to the modulation and demodulation circuit 118 (not shown) through the two-wire four-wire circuit 122 which is connected to the collector side in the same way as in the prior art.

The shunt regulator 132, which is comprised of a Zener diode ZD$_1$ and resistances R$_4$ and R$_5$, is provided in order to normally operate the power converter circuit 126 when the offhook current is slightly excessive.

The smoothing circuit 134 is a circuit for smoothing the input current of the power converter circuit 126 and is composed of a coil L$_1$ and a capacitor C$_2$.

This circuit 134 comprises the lowpass filter With the coil L$_1$ and the capacitor C$_2$ so as to keep the offhook current constant, even if the output voltage thereof fluctuates due to the operation of the power converter circuit 126.

Therefore, the NCU 120 in this embodiment of an equipment of the present invention in the offhook state supplies a signal current input from the telephone circuit 114 to the two-wire four-wire circuit 122 of modem 110 and also supplies the residual current of the offhook current to the power converter circuit 126 of power source device 124.

The power converter circuit 126 is comprised of what is called a self-excited converter. As the output terminals of the power converter circuit 126, a GND terminal, a positive terminal V$_{cc1}$ and a negative terminal V$_{EE1}$ for the two-wire four-wire circuit 122, and a terminal V$_{cc2}$ for the modulation and demodulation circuit 118 are provided. Signals having the same voltage level when the GND is a zero point are output to the positive terminal V$_{cc1}$ and the negative terminal VEE$_1$ for the two-wire four-wire circuit 122.

Since the self-excited converter is a known circuit, detailed explanation thereof will be omitted but the structure and the operation thereof will be briefly explained in the following.

To the base terminal of a transistor $Tr_4$, the positive terminal of the smoothing circuit 132 is connected through a resistor $R_6$, and the emitter terminal of the transistor $Tr_4$ is connected to the GND terminal.

The collector terminal of the transistor $Tr_4$ is connected to the positive terminal of the smoothing circuit 134 through a coiled winding $n_2$ of a transformer $T_1$.

The transformer $T_1$ further has a primary winding $n_1$, which is wound so as to have the same polarity as the primary winding $n_2$ and to be in series therewith. One end of the primary winding $n_1$ is connected to the cathode of a diode $D_2$, and the anode of the diode $D_2$ is connected to the GND terminal.

The other end of the primary winding $n_1$ is connected to the base terminal of the transistor $Tr_4$ through a capacitor $C_3$.

The primary circuit of the transformer $T_1$ comprises the self-excited oscillator, as described above. The oscillating operation will now be explained briefly.

When a predetermined voltage is applied from the positive terminal of the smoothing circuit 134, a base current is supplied to the transistor $Tr_4$ through the resistance $R_6$, whereby the transistor $Tr_4$ is turned on and is supplied a collector current from the positive terminal of the smoothing circuit 134 through the primary winding $n_2$.

At the same time, a charging current is supplied from the positive terminal of the smoothing circuit 134 to the capacitor $C_3$ through the primary winding $n_1$. The charging current acts in the direction of increasing the conductivity of the transistor $Tr_4$, and the transistor $Tr_4$ increases the collector current.

However, the current flowing through the winding $n_1$ becomes extinct in a comparatively short time because the capacity of the capacitor $C_3$ is small and, as a result, the base current cannot catch up with the increase in the collector current of the transistor $Tr_4$, and when the collector current exceeds the necessary amplified collector current based on the base current, as represented by the following formula (1), the transistor $Tr_4$ is rapidly inverted to the off state.

$$I_c > I_B \cdot hf_e \tag{1}$$

When the transistor $Tr_4$ is in the off state, the energy stored while the transistor $Tr_4$ is in the on state flows from the winding $n_1$ toward the capacitor $C_2$, thereby retaining the off period of the transistor $Tr_4$.

When the stored energy has been released, the base current of the transistor $Tr_4$ is again supplied through the resistance $R_1$ and the circuit continues self-excited oscillation.

Therefore, the self-excited oscillation frequency is determined by the circuit constant and the load.

By the self-excited oscillation, a current flows in the reverse direction on secondary windings $n_3$ and $n_4$ and charges capacitors $C_4$, $C_5$ and $C_6$ by diodes $D_3$, $D_4$ and $D_5$, respectively.

Consequently, it is possible to output positive and negative voltages of the same level to the positive and the negative terminals $V_{CC1}$ and $V_{EE1}$, as compared with the GND level respectively, thereby supplying a power to the two-wire four-wire circuit 122 of modem 110.

A predetermined voltage level is output to the terminal $V_{CC2}$ and supply of a power to the modulation and demodulation circuit 118 is also enabled.

In this way, it is possible to output positive and negative voltages of 5 to 10 V from the power converter circuit 126, which is a DC-DC converter, in accordance with the offhook current signal of 48 V, for example, which is output from the telephone circuit 114 in the offhook state.

In this embodiment, the shunt regulator 132 can be dispensed with, and the smoothing circuit 134 may use a transformer.

Figure 4:
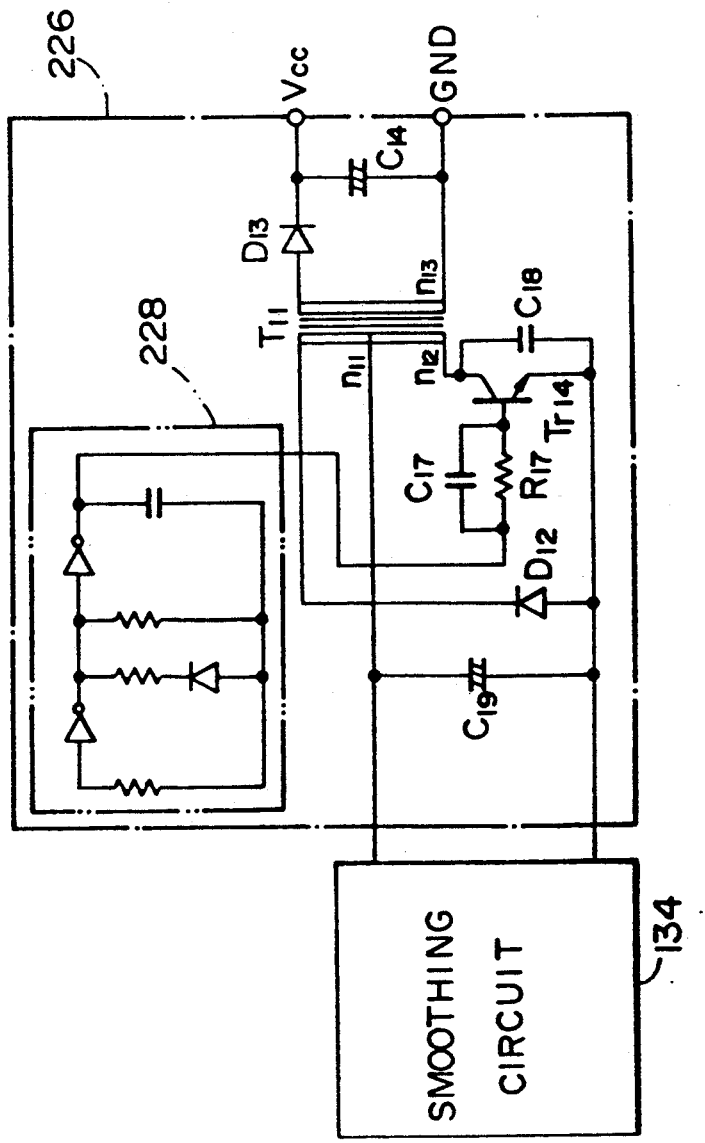
FIG. 4 is a circuit diagram of a power converter circuit 226, which is a separately-excited DC-DC converter used in a second embodiment of the present invention.
Figure 5:
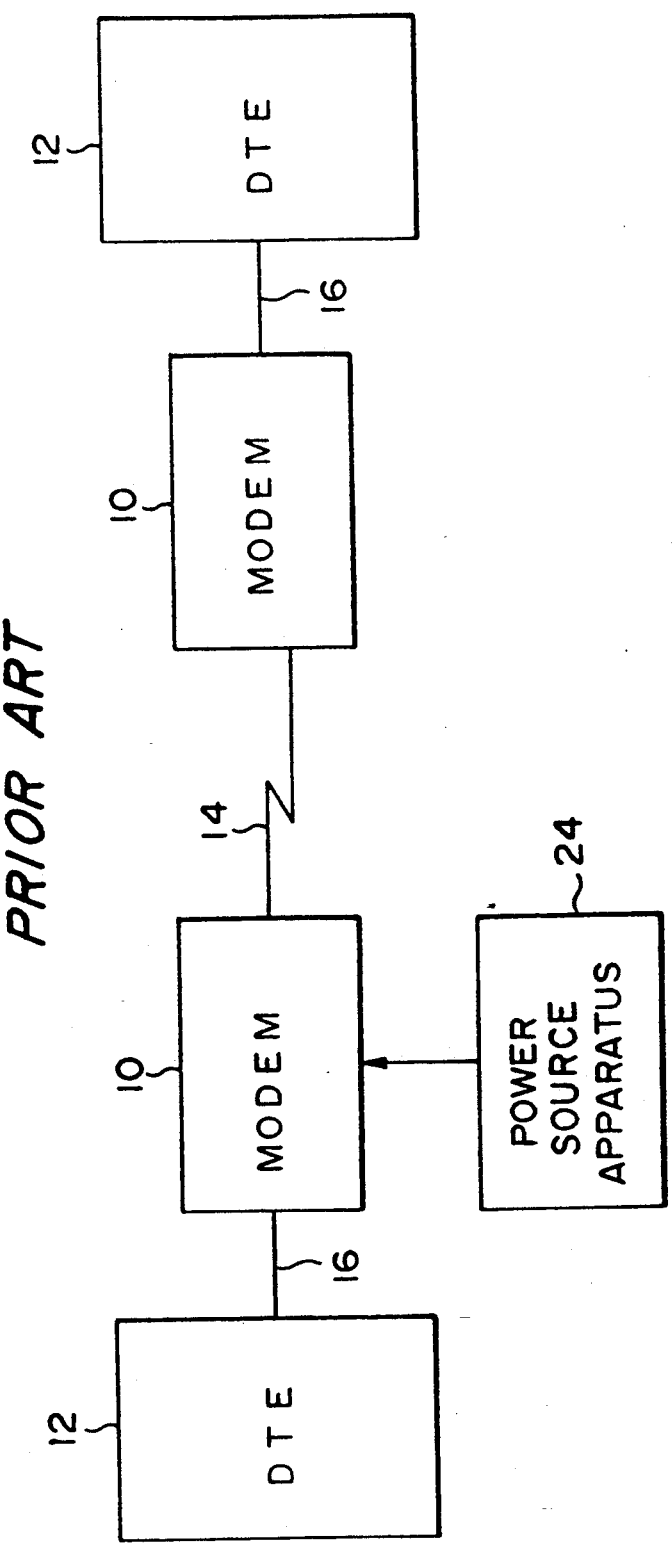
FIG. 5 shows the structure of a conventional data communication system.
Figure 6:
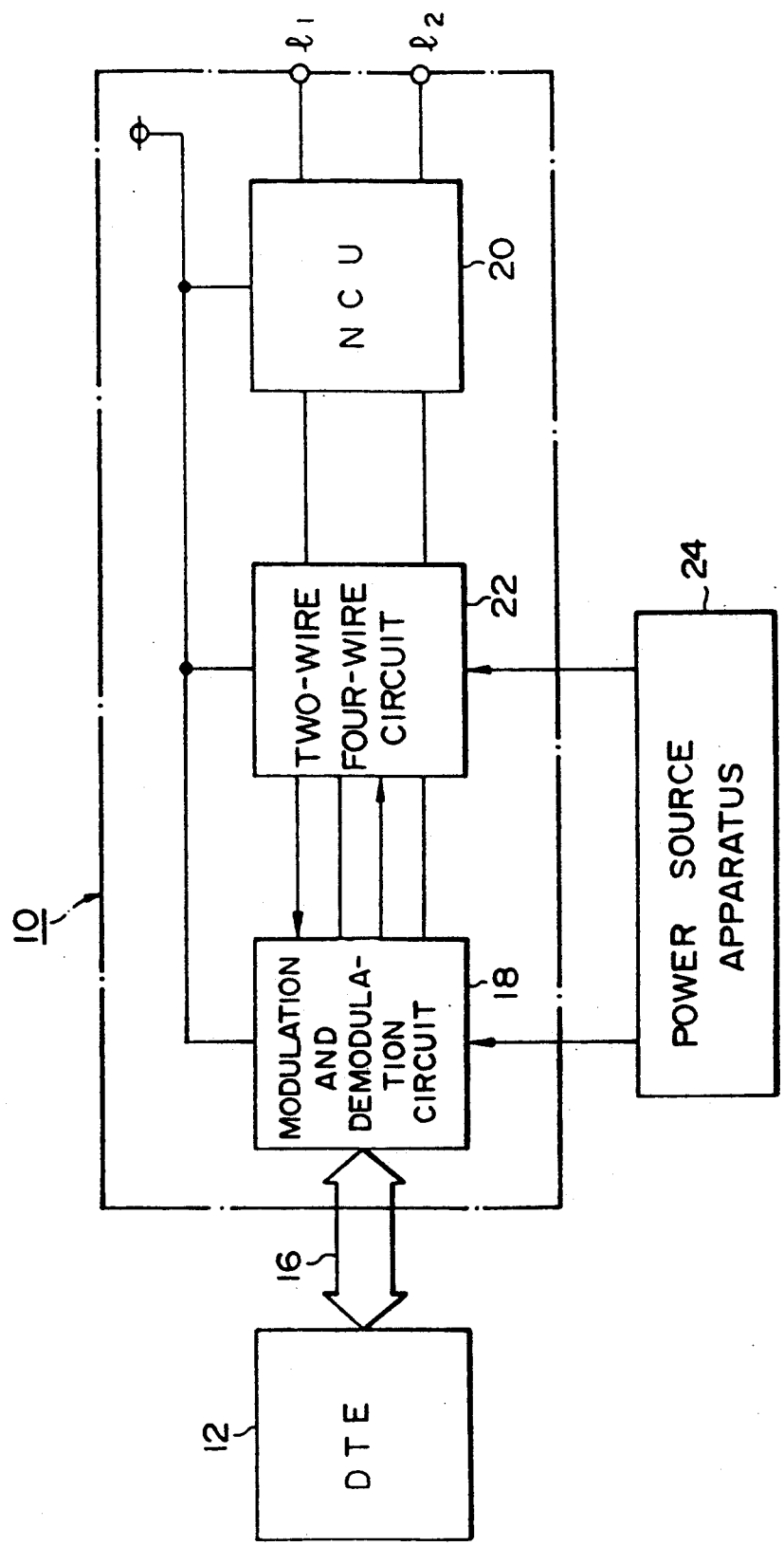
FIG. 6 is a block diagram of the structure of the modem 10 in the conventional data communication system shown in FIG. 5.

FIG. 4 shows the structure of a second embodiment of an equipment according to the present invention, in particular, the structure of a power converter circuit 226.

The power converter circuit 226 shown in FIG. 4 is a separately-excited DC-DC converter including a self-excited oscillator 228.

The operation of the power converter circuit 226 is as follows.

A transistor $Tr_{14}$ is first switched by a synchronous signal output from the self-excited oscillator 228. When the transistor $Tr_{14}$ is on, a current is supplied from the smoothing circuit 134 to the collector of the transistor $Tr_{14}$ through a primary winding $n_{12}$ of a transformer $T_{11}$.

On the other hand, when the transistor $Tr_{14}$ is off, a capacitor $C_{19}$ is charged by the counter electromotive force produced on a primary winding $n_{11}$.

As a result of these operations, a voltage is induced on a secondary winding $n_{13}$, and the voltage is rectified by a diode $D_{13}$ to be output to the outside, e.g., a two-wire four-wire circuit and a modulation demodulation circuit (not shown).

In FIG. 4, the winding of the transformer $T_{11}$ is a forward type coil directed toward the converter, but it may be a flyback type coil.

Figure 7:
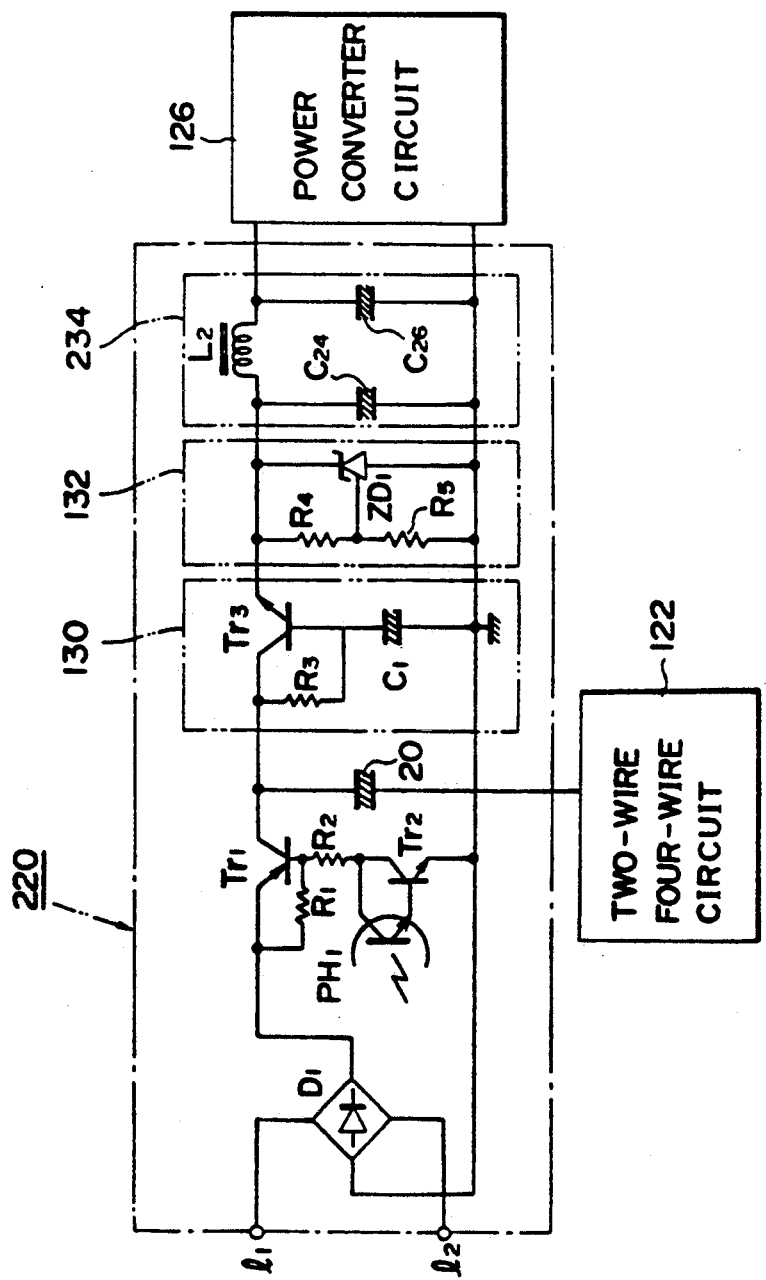
FIG. 7 is an alternate embodiment of a circuit diagram of an NCU 220 used in the present invention.

FIG. 7 shows another embodiment of the NCU according to this invention. In the NCU 220, the same elements as those in FIG. 3 are designated by the same numerals, and an explanation thereof is omitted. The output from the transistor $Tr_1$ is supplied to the two-wire four-wire circuit 122 through the capacitor $C_{20}$ for shutting out the D.C. component of the offhook current, and also to the constant-current circuit 130. This circuit 130 eliminates the A.C. component and supplies the D.C. component thereof to the shunt regulator 132. Thus, the NCU 220 can act to separate the signal current and the D.C. current from the offhook current.

The lowpass filter 234 connected between the shunt regulator 132 and the power converter circuit 126 smooths the current supplied from the shunt regulator 132. Further, this lowpass filter is a pai type lowpass filter composed of the condenser $C_{24}$, $C_{26}$ and the choke coil $L_2$, and passes the frequency below a communicating frequency in a telephone circuit, e.g. 300 Hz.

If the lowpass filter 234 is not provided, the current flowing through the $Tr_3$ would tend to oscillate simultaneously with the power converter circuit when the power converter circuit starts operating, causing the fluctuation of the offhook current flowing through the telephone circuit. The above-mentioned lowpass filter 234 can contribute to eliminate noises generated in the telephone circuit due to the power converter circuit operation.

As described above, according to the present invention, since the offhook current input from the telephone circuit through the NCU is supplied to the data circuit-terminating equipment after the power of the current is converted, no additional device for self power supply is necessary, thereby enabling the realization of a small-sized data communication system.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A data circuit-termination apparatus, comprising:
   a modem system connected to a telephone circuit and a data terminal equipment, said modem system at least for demodulating a circuit signal which is input from said telephone circuit and supplying the demodulated signal to said data terminal equipment, said modem system comprising:
   a modulation and demodulation circuit for modulating a signal supplied from said data terminal equipment and demodulating a circuit signal supplied from said telephone circuit;
   a two-wire four-wire circuit connected to said modulation and demodulation circuit;
   a power source device for extracting a power from an offhook current which flows on said telephone circuit at the time of offhook and supplying said power to said modulation and demodulation circuit; and
   a net control circuit for supplying power from the circuit signals in the offhook current which flows on the telephone circuit to said power source device and supplying a signal current from the offhook current to said two-wire four-wire circuit, said net control circuit including a constant current circuit and a smoothing circuit for smoothing said offhook current output from said constant-current circuit, said net control circuit including a circuit for supplying said offhook current to said constant current circuit, said supplying circuit being activated upon detection of an offhook state.

2. The data circuit-termination apparatus according to claim 1, wherein said net control circuit includes a shunt regulator for suppressing the excess of said offhook current output from said constant-current circuit.

3. The data circuit-termination apparatus according to claim 1, wherein said net control circuit includes a transistor circuit for supplying said offhook current to said constant current circuit, said transistor circuit being turned on when a first light receiving element detects the offhook state.

4. The data circuit-termination apparatus according to claim wherein said net control circuit includes a means for controlling the connection between said modulation and demodulation circuit and said telephone circuit.

5. The data circuit-termination apparatus according to claim 1, wherein said power source device includes a power converter circuit for converting said offhook current to said power.

6. The data circuit-termination apparatus according to claim 5, wherein said power source device includes a battery for supplying a battery power to said modulation and demodulation circuit only at the time of on-hook.

7. The data circuit-termination apparatus according to claim 5, wherein said power converter circuit includes a DC-DC converter for converting said offhook current to a DC current having a different value.

8. The data circuit-termination apparatus according to claim 7, wherein said power converter outputs two kinds of currents for supply to said modulation and demodulation circuit and said two-wire four-wire circuit, respectively.

9. The data circuit-termination apparatus according to claim 7, wherein said power converter circuit is a self-excited converter.

10. The data circuit-termination apparatus according to claim 7, wherein said two-wire four-wire circuit includes:
    a light receiving element for receiving a signal in the form of a light transmitted from said modulation and demodulation circuit; and
    a light emitting element for emitting a signal in the form of light to said modulation and demodulation circuit.

11. A modem system which is connected to a telephone circuit and a data terminal equipment said modem system at least for demodulating a circuit signal which is input from said telephone circuit and supplying the demodulated signal to said data terminal equipment, said modem system comprising:
    a modulation and demodulation circuit for modulating a signal supplied from said data terminal equipment and demodulating a circuit signal supplied from said telephone circuit;
    a two-wire four-wire circuit connected to said modulation and demodulation circuit;
    a power source device for separating a power from an offhook current which flows on said telephone circuit at the time of offhook and supplying said power to said modulation and demodulation circuit; and
    a net control circuit for supplying power from the circuit signals in the offhook current which flows on the telephone circuit to said power source device and supplying a signal current from the offhook current to said two-wire four-wire circuit, said net control circuit including a lowpass filter circuit for passing a direct current portion in said offhook current output and coupling an input side of said power source device.

12. The modem system according to claim 11, wherein said net control circuit includes a shunt regulator for suppressing the excess of said offhook current output from said constant current circuit.

13. The modem system according to claim 11, wherein said net control circuit includes a constant current circuit for obtaining a constant current from said offhook current and means for preventing said direct current portion from flowing to said two-wire four-wire circuit.

14. The modem system according to claim 13, wherein said net control circuit includes a transistor circuit for supplying said offhook current to said constant current circuit and being turned on when a first light receiving element detects the offhook state.

15. The modem system according to claim 11, wherein said net control circuit includes a means for controlling the connection between said modulation and demodulation circuit and said telephone circuit.

16. The modem system according to claim 11, wherein said power source device includes a power converter circuit for converting said offhook current to said power.

17. The modem system according to claim 16, wherein said power source device includes a battery for supplying a battery power to said modulation and demodulation circuit only at the time of onhook.

18. The modem system according to claim 16, wherein said power converter circuit includes a DC-DC converter for converting said offhook current to a DC current having a different value.

19. The modem system according to claim 18, wherein said power converter outputs two kinds of currents for supply to said modulation and demodulation circuit and said two-wire four-wire circuit, respectively.

20. A data circuit-termination apparatus, comprising:
   a data circuit-terminating device comprising a modem system which is connected to a telephone circuit and a data terminal equipment at least for demodulating a circuit signal which is input from said telephone circuit and supplying the demodulated signal to said data terminal equipment; and
   a power source device for extracting a power from an offhook current which flows on said telephone circuit at the time of offhook and for supplying said power to said data circuit-terminating device;
   said data circuit-terminating device including a net control circuit for separating power from the circuit signals in the offhook current which flows on the telephone circuit, and said power being supplied to said power source device;
   said power source device including a power converter circuit for converting said offhook current to said power and a battery for supplying a battery power to said data circuit-terminating device only at the time of onhook.

21. The data circuit-termination apparatus according to claim 20, wherein said data circuit-terminating device includes:
   a modulation and demodulation circuit for modulating a signal supplied from said data terminal equipment and demodulating a circuit signal supplied from said telephone circuit;
   a two-wire four-wire circuit connected to said modulation and demodulation circuit;
   a net control circuit for supplying power from the circuit signals in the offhook current which flows on the telephone circuit to said power source device and supplying a signal current from the offhook current to said two-wire four-wire circuit; and
   said net control circuit including a constant current circuit for keeping said offhook current in the form of a constant current and a smoothing circuit for smoothing said offhook current output from said constant current circuit.

22. A data circuit-termination apparatus comprising:
   a data circuit-terminating device comprising:
      a modulation and demodulation circuit for modulating a signal supplied from a data terminal equipment and demodulating a circuit signal supplied from a telephone circuit;
      a net control circuit for controlling the connection between said modulation and demodulation circuit and said telephone circuit;
      a two-wire four-wire circuit connected to said modulation and demodulation circuit and divided into a transmitting circuit and a receiving circuit;
      said net control circuit including a first light receiving element for detecting the offhook state, a transistor circuit for turning on when said first light receiving element detects the offhook state, a constant current circuit for keeping an offhook current in the form of a constant current, a shunt regulator for suppressing the excess of said offhook current output from said constant current circuit and a smoothing circuit for smoothing said offhook current output from said constant current circuit, said two-wire four-wire circuit including a second light receiving element for receiving a signal in the form of light transmitted from said modulation and demodulation circuit, and a light emitting element for emitting a signal in the form of light to said modulation and demodulation circuit;
   said data circuit-terminating device being a modem system which is connected to said telephone circuit and said data terminal equipment so as to demodulate said circuit signal input from said telephone circuit and output said signal to said data terminal equipment, and modulate a signal input from said data terminal equipment and supply said signal to said telephone circuit; and
   a power source device for extracting a power from an offhook current which flows on said telephone circuit at the time of offhook and supplying said power to said modulation and demodulation circuit.

23. The data circuit-termination apparatus according to claim 22, wherein said power source device includes a power converter circuit for converting said offhook current to said power.

24. The data circuit-termination apparatus according to claim 23, wherein said power source device includes a battery for supplying a battery power to said data circuit-terminating device only at the time of onhook.

25. The data circuit-termination apparatus according to claim 23, wherein said power converter circuit includes a DC-DC converter for converting said offhook current to a DC current having a different value.

26. The data circuit-termination apparatus according to claim 25, wherein said DC-DC converter outputs two kinds of currents for supply to said modulation and demodulation circuit and said two-wire four-wire circuit, respectively.

27. The data circuit-termination apparatus according to claim 25, wherein said DC-DC converter is a self-excited converter.

28. A data circuit-termination apparatus comprising:
   a data circuit-terminating device comprising a modem system which is connected to a telephone circuit and a data terminal equipment, said data circuit-terminating device at least for demodulating a circuit signal which is input from said telephone circuit and for supplying the demodulated signal to said data terminal equipment;
   a power source device for extracting a power from an offhook current which flows on said telephone circuit at the time of offhook and for supplying said power to said data circuit-terminating device, said power source device including a battery for supplying a battery power to said data circuit-terminating equipment only at the time of on hook.

* * * * *